Nov. 15, 1960  R. G. BROWNSTEIN  2,959,944
COUPLING
Filed Dec. 31, 1958  2 Sheets-Sheet 1

INVENTOR.
Raymond G. Brownstein
BY Webb, Mackey & Burden
HIS ATTORNEYS

Nov. 15, 1960 R. G. BROWNSTEIN 2,959,944
COUPLING
Filed Dec. 31, 1958 2 Sheets-Sheet 2

INVENTOR.
Raymond G. Brownstein
BY Webb, Mackey + Burden
HIS ATTORNEYS

United States Patent Office 2,959,944
Patented Nov. 15, 1960

2,959,944
COUPLING

Raymond G. Brownstein, Ellwood City, Pa., ass'gnor to The Atomatic Manufacturing Co., East Pittsburgh, Pa., a corporation of Pennsylvania Filed Dec. 31, 1958, Ser. No. 784,148

7 Claims. (Cl. 64—15)

Many flexible couplings are known for connecting a driving shaft with a driven shaft. However, all the known couplings have a large number of parts, many of which must be specially machined. Consequently, the cost of fabricating these known couplings is quite high. Furthermore, the known couplings are complex to assemble and disassemble, difficult to lubricate and require excessive maintenance due to wear of the machined surfaces.

The present invention is directed to a coupling for connecting a driven shaft and a driving shaft. My coupling has relatively few parts, none of which require substantial special machining. Consequently, the cost of manufacturing my coupling is small in comparison to the known couplings.

The most advantageous factors of my coupling are that it is simple to assemble and disassemble; requires no special tools for assembly; and is extremely easy to lubricate. Furthermore, my coupling has relatively few parts sliding relative to each other to cause wear of the surfaces of the coupling.

My invention will function successfully under conditions of misalignment of the coupled shafts to which the known couplings cannot be adapted.

In the drawings, I have illustrated a present preferred embodiment of my invention, in which.

Briefly, the present invention consists of a free aligning coupling for connecting driving and driven shafts which are spaced from each other and disposed in approximate alignment. The coupling comprises a pair of identical hubs, one of which is affixed to each of the shafts. A portion of each hub is enlarged having a greater circumference than the remainder of the hub. The enlarged portions are positioned in face to face relationshsip but spaced from each other. A plurality of holes are drilled in each of the enlarged portions. The holes in one hub are maintained in alignment with the holes in the other hub. Helical springs are positioned in each of the holes in one of the hubs and extend across the space between the hubs and into the holes in the other hub. The springs are retained in the hole in any desirable manner; for example, by split retaining rings.

Figure 1:
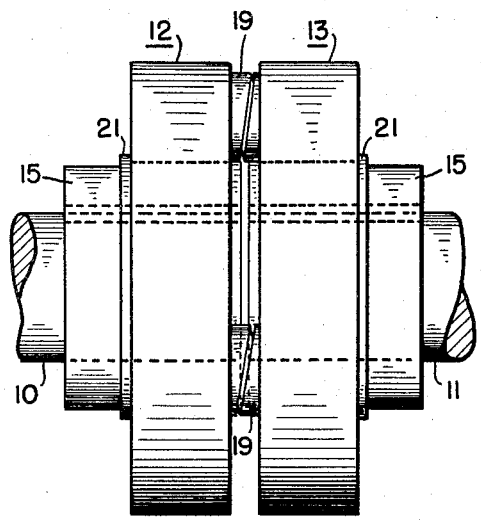
Figure 1 shows a side elevation view of my coupling.
Figure 2:
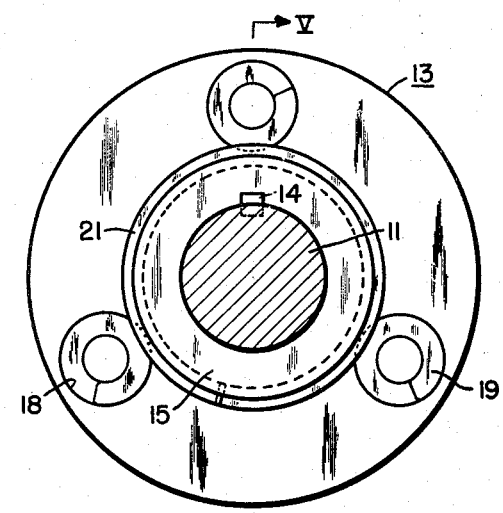
Figure 2 shows an end elevation view of my coupling.
Figure 3:
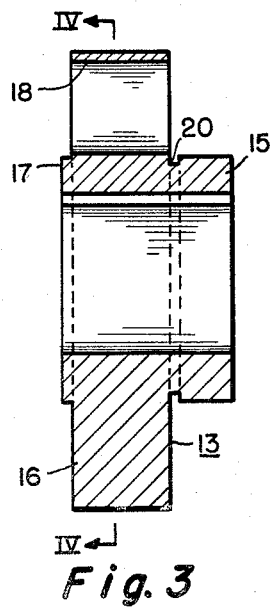
Figure 3 shows a cross section through one of the hubs of the coupling with parts removed for clarity.
Figure 4:
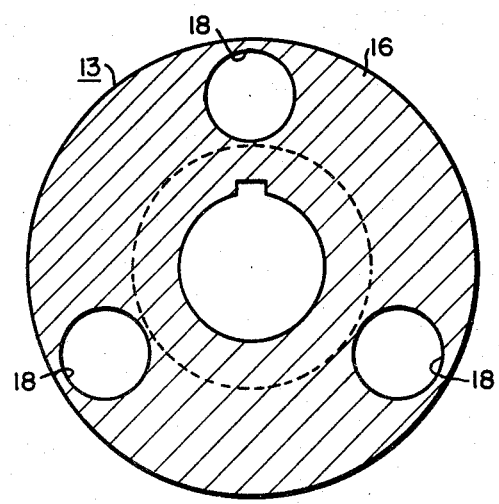
Figure 4 shows a cross section of one of the hubs of the coupling taken on line IV—IV of Figure 3.
Figure 5:
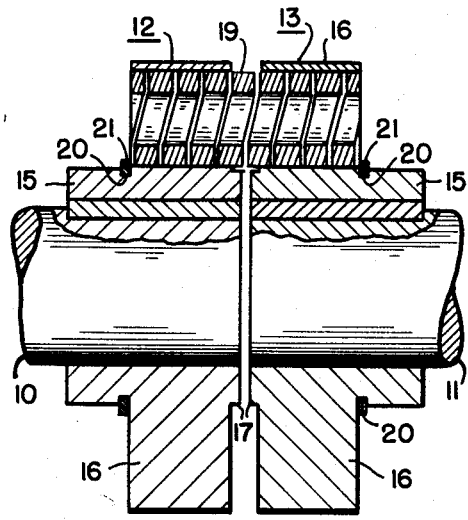
Figure 5 is a cross section of part of my coupling taken on line V—V of Figure 2.
Figure 6:
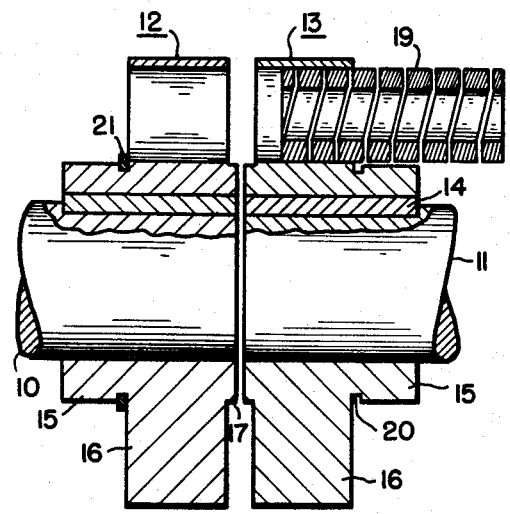
Figure 6 is a cross section of my coupling similar to Figure 5 showing a spring in partially removed position.

More specifically, a driving shaft 10 is spaced from and in approximate alignment with a driven shaft 11. Two identical hubs 12 and 13 are affixed to each of the shafts by a key 14 or set screw (not shown). Each of the hubs 12 and 13 consist of an inner sleeve member 15 which is positioned around the shafts 10 and 11. A portion of each hub 12 and 13 is enlarged in a circular configuration 16. The enlarged portion of each hub is not coextensive with a front face 17 of the sleeve 15. A small ridge is thus located on the inner face of each hub. A plurality of holes 18 are cut in each of the enlarged portions 16. These holes may be from 3 to 8 in number depending upon the amount of torque which the coupling must withstand in use. The hubs 12 and 13 are positioned on a shaft in face to face relationship as shown in Figure 6. The holes 18 in each of the hubs are in alignment so that a helical spring 19 may be inserted through the hole 18 in hub 13, across the opening between the hubs, and into the hole 18 in hub 12. A spring 19 is so positioned in each pair of aligned holes. Three to eight springs may be used on any coupling. The springs 19 may be of any shape but preferably are helical.

Each of the hubs 12 and 13 have a circumferential groove 20 located in the sleeve 15 immediately adjacent the enlarged portion 16 and on the side of the enlarged portion opposite to the face 17. A split retaining ring 21 is positionable in the groove 20 of each of the hubs. The rings 21 are of sufficient radial thickness that they overlap part of the holes 18—the outermost part of ring 18 is a greater radial distance from the center of the coupled shafts than the innermost part of holes 18.

Figure 6 shows the manner of assembling the coupling in position on the shafts. The hubs 12 and 13 are keyed to the shafts 10 and 11, the retaining ring 21 is positioned in groove 20 in hub 12. The holes 18 are aligned and spring 19 inserted through the hole 18 in hub 13, across the spacing between the hubs, and into hole 18 in hub 12. A retaining ring 21 is then inserted in groove 20 in hub 13.

For lubrication, a lubricating wick is inserted through the center of spring 19 after assembling the coupling. This lubricating wick normally extends a short distance out one side of the spring 19 such that oil can be placed on the wick and is absorbed thereby and periodically dispenses the lubricating oil to the spring 19.

Figure 7:
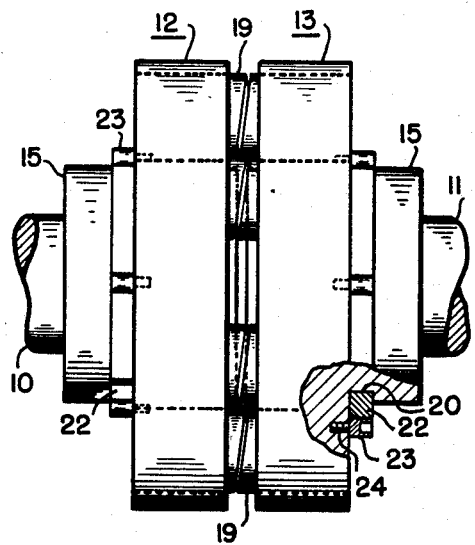
Figure 7 is a side elevation view of a modified form of my coupling.
Figure 8:
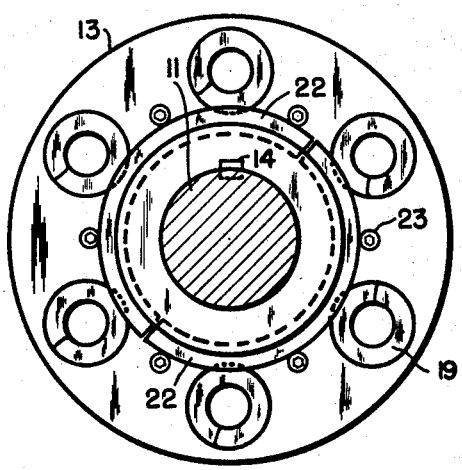
Figure 8 is an end elevation view of my modified form of coupling.

Figures 7 and 8 show a modified form of coupling. This type coupling is for larger shafts and for connections having the ability to withstand larger torques. Normally, such couplings have at least six springs 19 therein and sometimes as many as eight springs. The hubs are constructed as described above and affixed to the shaft preferably by means of a key. The grooves 20 are of much greater dimensions than the grooves described above since a semi-circular retaining ring 22 is positioned in the groove. The retaining ring 22 consists of two semi-circular units which are positioned in the groove and partially overlap the holes in the hub, thereby retaining the springs in position. The retaining ring 22 is maintained in position by a plurality of Allen socket head cap screws 23 which are threaded into holes 24 tapped in the hubs. The head of the cap screw is immediately adjacent the ring 22 and maintains it in the groove 20.

Of particular importance in my invention is the use of a spiral spring 19 made from spring wire having a square cross section. This square cross section results in maximum spring strength and thus maximum load transmitting capacity. The square wire is about 67% stronger in bending than the round wire of the same thickness. The square wire allows finish machining of the outside surface of the spring so that it can have a sliding fit in the machined holes 18 of the hubs 16. The square wire spring, when machined as above, presents a comparatively large bearing surface for load carrying and reduces the unit bearing load and wear, thus gaining a long operational life. A round wire spring does not have these characteristics. The large bearing surface also improves the efficiency of lubrication. The spring wire can have a rectangular cross section but square is preferred.

Illustrative sizes for the coupling are as follows: For a maximum shaft diameter ½" which requires 210 inch-pounds standstill torque, the diameter of the enlarged portion of the hub is 2", the diameter of the sleeve is ¾", the length of the coupling when positioned on a shaft is 2", the length of a single hub along the shaft is 29/32", the gap between the two hubs is 3/16", the distance necessary to disconnect the coupling when assembled on the shafts is 1 7/16" from the gap, the distance required to assemble the coupling is 2⅛" from the gap, and the number of springs is 3.

Similar dimensions for a maximum shaft diameter 1½" which requires 730 inch-pounds standstill torque, the diameter of the enlarged portion of the hub is 4⅛", the diameter of the sleeve is 2⅞", length of the coupling when assembled on the shaft is 4¼", length of a single hub is 2 1/32", gap between the hubs when assembled on the shafts is 3/16", distance required to disconnect the coupling is 1 7/16" from the gap, distance required to assemble the coupling on the shafts is 2⅛" from the gap, and number of springs is 4.

Similar dimensions for a maximum shaft diameter of 2" which requires 2,520 inch-pounds standstill torque, the diameter of the enlarged portion of the hub is 4¾", diameter of the sleeve is 3¼", length of the hub when assembled on the shaft is 5¼", length of a single hub is 2½", gap between the hubs when assembled on the shafts is ¼", distance required to disconnect the hubs is 1⅞", distance required to assemble the coupling on the shafts is 2¾", and number of springs is 8.

While I have described a present preferred embodiment of my invention, it may be otherwise embodied within the scope of the following claims.

I claim:

1. A flexible free-aligning coupling for connecting driving and driven shafts spaced from each other and in approximate axial alignment, said coupling including a radially extending hub affixed to each of said shafts, said hubs being in opposed, spaced face-to-face relationship to each other, each of said hubs having a plurality of holes therein, said holes being radially spaced from and parallel to said shafts, the holes in one hub being in approximate alignment with the holes in the other hub; a hollow helical spring positioned in each of said holes in one hub and extending across the space between the hubs and into said holes in the other hub; said springs being axially slidably fit in said holes and having a flat outer surface in contact with the sides of the holes such that there is a large bearing surface between said outer surface of the springs and the sides of the holes; each of said springs being of substantially the same transverse cross-sectional area throughout its entire length; and means to maintain said springs in each of said holes such that the hubs may yield torsionally relative to each other.

2. A coupling according to claim 1 wherein said spring is made from wire having at least one flat side; said flat side of the wire forming said flat outer surface of the spring.

3. A coupling according to claim 1 wherein said spring is made from wire having a square cross-section; one of the flat sides of the wire forming said flat outer surface of the spring.

4. A coupling according to claim 1 including a wick positioned inside each of said hollow helical springs and adapted to function as a lubrication dispensing means.

5. A coupling according to claim 1 wherein said holes extend completely through at least one of said hubs, such that said helical springs are insertable axially through one of said holes and across the space between the hubs into an aligned hole in the other hub; and said springs are maintained in said holes by a removable retaining ring positioned in a groove adjacent the end of the spring.

6. A free-aligning, flexible, yieldable shaft coupling for horizontal and vertical connection of a driving shaft and a driven shaft spaced from each other and in approximate axial alignment; said coupling consisting essentially of a first hub affixed to the driving shaft, a second hub affixed to the driven shaft, said hubs being in spaced face-to-face relationship to each other; a plurality of holes in each of said hubs, said holes extending axially parallel to said shafts; the holes in said first hub being in approximate axial alignment with the holes in the second hub; a helical spring slidably fit in each pair of aligned holes and extending across the space between the hubs; said springs being slidable axially within the holes and having a flat outer surface in sliding engagement with the sides of the holes; the transverse cross-sectional area of each spring being substantially constant throughout the length of the spring; the flat outer surface of the spring providing a large bearing surface between the spring and the sides of the hole in which the spring is positioned; and means to maintain the springs in the holes.

7. A coupling according to claim 6 wherein said holes extend completely through said hubs such that the springs may be inserted in the holes by an axial movement.

References Cited in the file of this patent

UNITED STATES PATENTS

| | | |
|---|---|---|
| 1,284,683 | Holy | Nov. 12, 1918 |
| 1,321,249 | Shepherd | Nov. 11, 1919 |

FOREIGN PATENTS

| | | |
|---|---|---|
| 689,146 | France | May 20, 1930 |
| 670,803 | Germany | Jan. 26, 1939 |